March 19, 1929. J. SCHMIDT 1,705,544
MACHINE FOR WASHING FRUITS AND VEGETABLES
Filed Jan. 23, 1925  3 Sheets-Sheet 3

Patented Mar. 19, 1929.

1,705,544

UNITED STATES PATENT OFFICE.

JOHN SCHMIDT, OF HOOPESTON, ILLINOIS, ASSIGNOR TO SPRAGUE-SELLS CORPORATION, OF HOOPESTON, ILLINOIS.

MACHINE FOR WASHING FRUITS AND VEGETABLES.

Application filed January 23, 1925. Serial No. 4,248.

This invention relates to a machine for washing and treating fruits and vegetables prior to canning and utilizes a body of water agitated by means of jets of air discharged within the body of water in which the fruit or vegetables are immersed or floating.

In the canning of all fruits and vegetables it is necessary as a preliminary operation of preparation to employ some means of removing dirt and foreign matter from the material, and various means have been employed for the purpose, but in no instance previous to this invention has an automatic apparatus been provided for doing this work in as efficient or convenient a manner.

An object of the invention contemplates providing a longitudinally arranged machine having two compartments, in each of which is arranged a chain type of conveyor moving in both horizontal and inclined directions to properly convey the material being handled through and out of the water compartments.

Another object of the invention resides in providing means for discharging jets of air, under pressure, into the bodies of water to thereby keep the water in agitation and thus keep the fruit and vegetables turning and moving about during their passage therethrough to better effect a proper and and thorough cleaning.

Another object of the invention resides in providing a settling department in the bottom of the compartmented tank for receiving the dirt and residue washed from the fruit or vegetables, with means for discharging the accumulated débris therefrom at frequent intervals during the operation of the apparatus.

A further object resides in providing a self contained unit supplied with means for compressing and conveying air to the several compartments of the machine; means for supplying water in the required quantities; drive means for operating the several movable elements of the apparatus with means adjacent each water compartment for creating a current flow of the water in each compartment that will tend to gently move the body of fruit or vegetables being treated, forward through the machine and thus permit of a rapid and continuous passage of material through the apparatus, giving it a very large output and a highly efficient operation.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it to be understood that the several necessary elements and combinations constituting the same may be varied in their proportions, placement, general arrangement and operative relation without departing from the scope and nature of my invention.

In carrying out the objects of my invention in a concrete form or machine, further objects, advantages and improvements have been evolved than have been recited, and in order to make the invention more clearly understood there are shown in the accompanying drawings, means and mechanism embodying the preferred structural arrangement and the preferred disposition of the different parts and combinations, in which I have simply illustrated one way of embodying the creative part or conception of the invention in a concrete form or machine, and in so doing I do not wish to limit the claims to the exact details shown.

The described devices are simply embodiment of the invention which other structures might also employ and some of the parts and combinations of parts may be used without the others in different types of such machines without departure from the purview of my invention and I regard myself as entitled to such veriations from the shown and described devices as fall within the scope and meaning of the claims appended hereto.

Reference being now had to the accompanying drawings a better and clearer understanding of the invention as applied to an operative machine will be had. It being understood that the drawings do not necessarily represent the best or the preferred engineering practices in the construction of apparatus of this class; are not necessarily accurate as to scale or dimension and that some parts may be exaggerated relative to other parts in order to better show and illustrate the operation of the apparatus.

Figure 1:
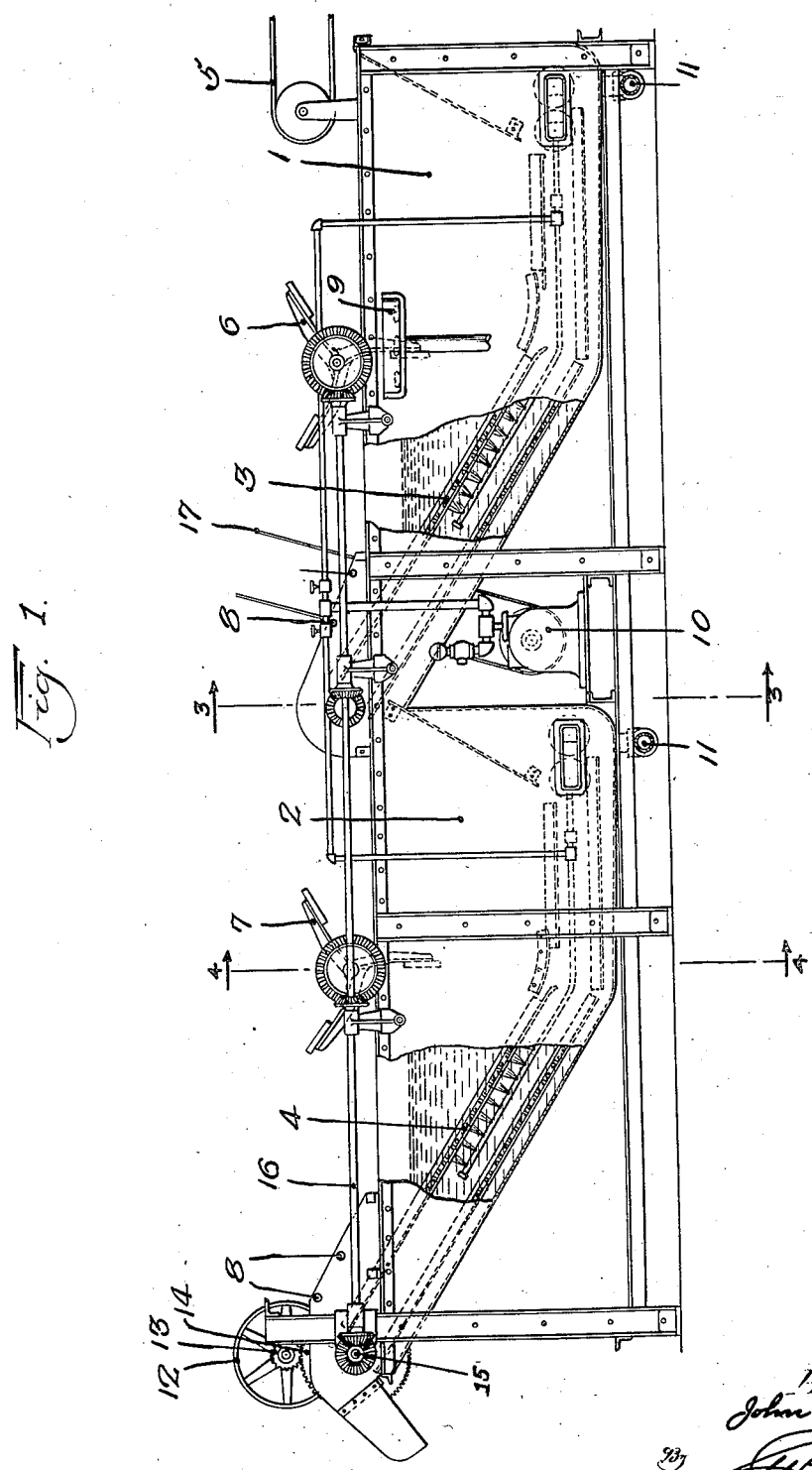
Fig. 1 is a side elevation of an apparatus embodying the invention with parts of the housing broken away to better show the interior construction and operation. This view clearly shows the elevators; air jets; air compressor; driving mechanism and the general arrangement of the operative elements.
Figure 2:
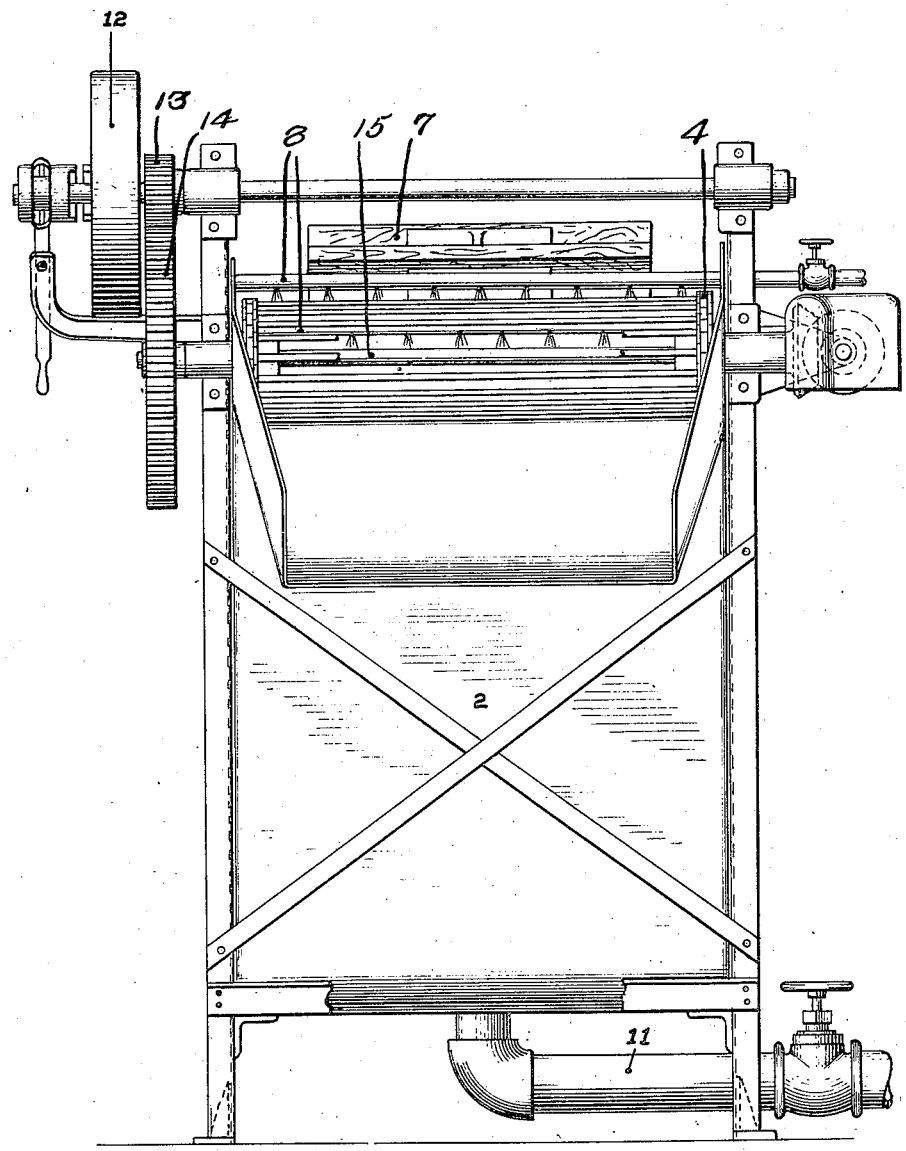
Fig. 2 is an end elevation of the discharge end of the apparatus. This view clearly shows the water pipes for conveying and discharging jets of clean water onto the washed material just as it is being elevated out of the water compartments and the geared arrangement of the driving mechanism.
Figure 3:
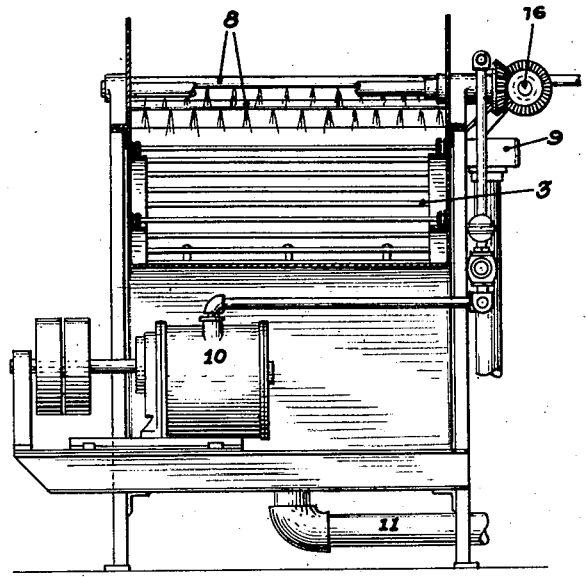
Fig. 3 is a cross sectional elevation on approximately the line 3—3 of Fig. 1 looking in the direction of the arrows and shows the lateral location of the air compressor; the air piping; water pipes and jets and the location of the conveyor in the main housing.
Figure 5:
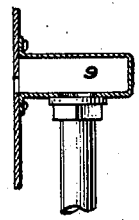
Fig. 5 is a detail of the overflow device from the water compartments.
Figure 4:
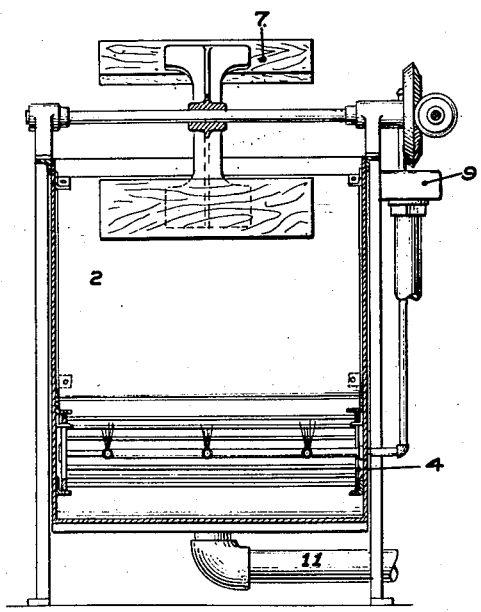
Fig. 4 is a cross sectional elevation on approximately the line 4—4 of Fig. 1 and clearly shows one of the rotary agitators for producing a current flow in the water compartments.

The general arrangement of a machine embodying my invention comprises a longitudinally arranged double compartmented tank built up of structural steel and plates as being a very suitable material, the compartmented tanks are designated by the numerals 1 and 2. Arranged in each of the tanks are conveyors 3 and 4, each having a portion located adjacent the bottoms of the tanks traveling in a horizontal direction and then moving toward the tops of the tanks in an inclined direction. The conveyor in compartment 1 discharging into compartment 2 and the conveyor in compartment 2 discharging from the apparatus. The material to be washed, such as any globular fruits or vegetables as well as spinach, kale, beet greens and the like may be placed in compartment 1 by hand means or it may be deposited into the compartment 1 by means of a belt conveyor as is indicated at 5.

The fruits or vegetables ordinarily float in the water in the compartments. A current flow in each compartment is produced by agitator elements 6 and 7 arranged about centrally over each compartment and having paddles that dip into the water and among the floating material and cause it to flow toward the exit end of the compartment where it comes in contact with the inclined portions of the moving elevators and is there picked up and, in the first instance, discharged into the adjoining compartment, and in the second instance discharged into a suitable receptacle, not shown, for conveyance from the washing machine.

Water is supplied to the compartments through the medium of suitable pipes 8, located adjacent the discharge end of each of the inclined elevators, and is discharged into the compartments through small holes producing jets that strike onto and wash the outcoming material with clean water. The water from tank 2 overflows into tank or compartment 1 and is discharged from this compartment through an overflow device indicated by the numeral 9.

To assist in the proper washing of the material, air jets are projected into the mass of material from a point below the inclined portions of the conveyors 3 and 4. These air jets have the effect of keeping the material somewhat separated and in motion so that it comes in contact with changing water and is thus more efficiently washed and cleaned of the débris accompanying such product during the harvesting and conveyance to the source of disposal. The cross bars of the conveyors act as interrupters to the air jets and in a measure prevent them from blowing straight out into the water.

Air under a moderate pressure is provided for the purpose through the medium of a suitable pressure blower indicated at 10, and is transmitted to the source of discharge by suitable piping as shown.

The horizontal portion of each conveyor travels adjacent the bottom of each compartment, but is spaced therefrom a sufficient distance to provide a settling space for the dirt and foreign matter removed from the material, and since this settled residue is below the region of agitation of the washing medium it is not thereby redistributed throughout the body of water, so that the material being cleansed is subjected to comparatively clean water at all times, and is especially washed with clean water from the water jets at each discharge point as it passes over the end of the conveyor.

To assist in producing the proper forward movement of the material through the washing medium the agitators or current flow members 6 and 7, rotating at a proper speed and dipping into the water and mass of material, constantly urge it forward toward the discharge end of each compartment, so that a continuous movement is maintained and thus a comparatively large amount of material may be handled in a given time and a continuous operation maintained.

Suitable discharge means are provided for disposing of the accumulated residue in the bottoms of the compartments, at frequent intervals, by the pipes 11.

The operative elements of the apparatus receive motion from a power transmission system comprising a clutch member 12, pinion 13, gear 14, shaft 15, connecting with the horizontally disposed shaft 16 through the medium of suitable miter gears located in a manner to connect the various elements as is well shown in Fig. 1. The blower receives motion from a separate source of power through the belt 17.

The operation of the machine illustrated as embodying one form of my invention would be substantially as follows:

The operation may differ somewhat, however, in another form of machine embodying the concept of the invention, wherein the arrangement of the operative elements may be somewhat different, but the result produced in its operation the same, or substantially the same.

The material to be treated may be supplied to the apparatus through the medium of a suitable belt, or other type of conveyor and dumped directly into the body of water in compartment 1. Most fruits and vegetables or leafy material will float. Through the agitating action of the rotary members 6 and 7 the water in which the material is dumped, is in more or less motion. Motion is also imparted to the washing water by means of air jets discharging into the body of liquid from below. The combined action of the agitators 6 and 7 and the air jets will be to keep the material in movement and turning over and over and rubbing against each other in a gentle manner whereby the dirt and foreign matter will be rubbed and washed off and drop into the settling space permitting the material being treated to come constantly into contact with clean water. After this washing through the agitation of the water the material passes toward the discharge end of each compartment and as it is being elevated out of the main body of wash water it is thoroughly sprayed by the water jets coming from the pipes 8 located over the upper ends of the conveyors 3 and 4. This thorough spraying gives it a final cleansing that will remove the last vestige of dirt and residue. This is especially so at the final discharge, since then the material has passed through both compartments of the washing apparatus, the second compartment completely removing any adhering dirt that might not have been removed in the first compartment.

Another very important feature of the operation of this apparatus should be mentioned. The rubbing together of the fruit in this washer due to the agitation of the water by the air jets, is so gentle that there is no bumping of the fruits to cause breaking of the skins and thereby permit what is technically called bleeding. The fruit comes out of this washer just as sound as when it went in, and this is a very important item in the canning of fruits and vegetables. The complete elimination of the tendency to bruise the fruit permits it to pass to the processing room with all of its natural flavors and aromas.

Owing to the agitator elements 6 and 7, located at the top of the compartments and the air jets discharging under the conveyors in an upward direction, the lower strata of water in each compartment is practically quiescent so that the residue gradually settling into this region finds lodgment in the bottom of each compartment and remains there undisturbed until such time as it becomes desirable to remove it through the medium of the discharge pipes shown. This operation of removal can be performed while the machine is in full operation, there being sufficient water supplied to prevent a detrimental lowering of the level in the compartments.

The first compartment where the material is received removes practically all of the adhering residue, and of course the water in this compartment is somewhat more dirty on this account. The second compartment is the final cleansing compartment and will remove all of the remaining residue, which usually is not excessive, so that the final washing is in comparatively clean water with the result that any material passed through this machine is more thoroughly and completely cleansed than has heretofore been possible with other types of apparatus.

The conveyors 3 and 4 are of the ordinary chain type with tie bars connecting the two sides, these tie bars extending laterally across the compartments are in position to engage and pick up the moving material as it passes out of the cleansing water. A bed plate is located under each inclined portion of the conveyor chains to prevent the material from passing through the cross bars, so that it will be surely picked up by the conveyors as they come in contact and will be passed on to the next compartment or be discharged from the machine.

Having thus described my invention what I claim as new and desire to secure by Letters Patent is:

1. An apparatus for washing fruits and vegetables comprising a compartment through which material is passed, a body of cleansing fluid in said compartment, an elevator wholly contained within said compartment and arranged for both horizontal and inclined movement, the horizontal portion being spaced away from the bottom of said compartment to provide a settling space in said compartment, means for supplying air under pressure to the under side of the inclined portion of said elevator, with means for moving floating material toward the inclined portion of said elevator.

2. An apparatus for washing fruits and vegetables comprising a compartment through which material is passed, a body of cleansing fluid in said compartment, an elevator wholly contained within said compartment and arranged for both horizontal and inclined movement, the horizontal portion being spaced away from the bottom of said compartment to provide a settling space thereunder, a deflector adjacent the end of said horizontal portion of said elevator to direct all sinking material onto said elevator, means including a compressor for supplying air under pressure to the under side of the inclined portion of said elevator, with means for directing floating material onto the inclined portion of said elevator.

3. An apparatus for washing fruits and vegetables comprising a compartment for containing a liquid cleansing material, an overflow device for maintaining said liquid to approximately a constant level, an elevator wholly contained within said compartment and having both horizontal and inclined portions, the horizontal portion being spaced away from the bottom of said compartment to provide a settling space for residue thereunder, means including a compressor for supplying air under pressure to the under side of the inclined portion of said conveyor, with means for directing floating material toward the inclined portion of said elevator and other means for directing sinking material onto the horizontal portion of said elevator.

4. An apparatus for washing fruits and vegetables comprising a tank in which a body of washing water may be maintained, a portion of the bottom of said tank lying in a horizontal plane and another portion lying in an angular plane, an elevator positioned in said tank and lying in spaced relation with the bottom of said tank and following substantially the shape thereof, means for conveying air under pressure to the under side of the inclined portion of said elevator, means adjacent said tank for producing compressed air, means for directing floating material toward the inclined portion of said elevator, means for directing sinking material toward the horizontal portion of said elevator, with means for directing washing fluid onto the top of material floating on the surface of said washing water.

In testimony whereof I affix my signature.
JOHN SCHMIDT.